Figure 1:
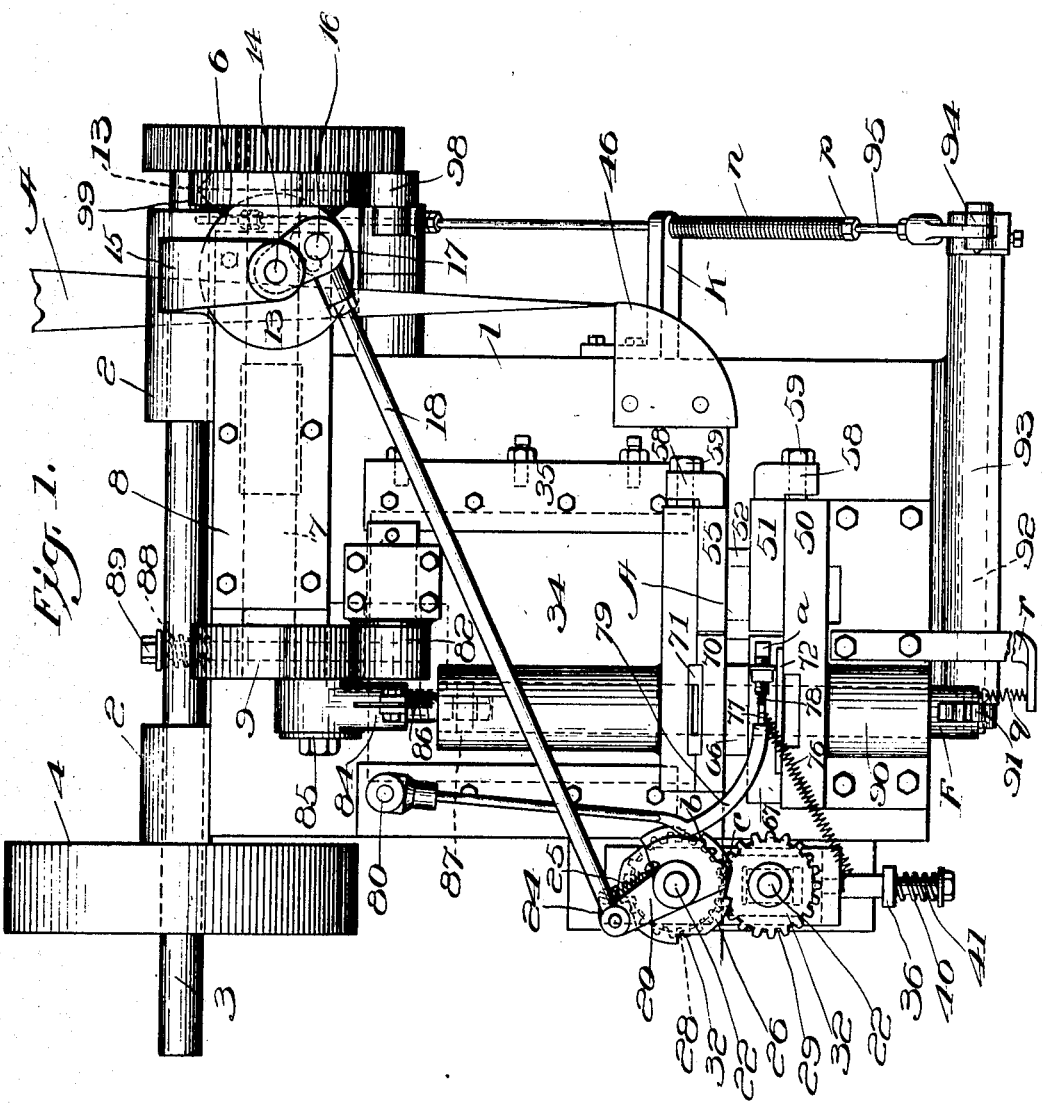

No. 892,743.   
PATENTED JULY 7, 1908.  
L. C. KRUMMEL & J. C. TALIAFERRO.  
CAN CAP HEMMING MACHINE.  
APPLICATION FILED JULY 20, 1906.

6 SHEETS—SHEET 1.

WITNESSES:

INVENTORS  
Louis C. Krummel  
John C. Taliaferro  
BY  
Alfred Wilkinson  
ATTORNEY.

No. 892,743. PATENTED JULY 7, 1908.
L. C. KRUMMEL & J. C. TALIAFERRO.
CAN CAP HEMMING MACHINE.
APPLICATION FILED JULY 20, 1906.
6 SHEETS—SHEET 2.
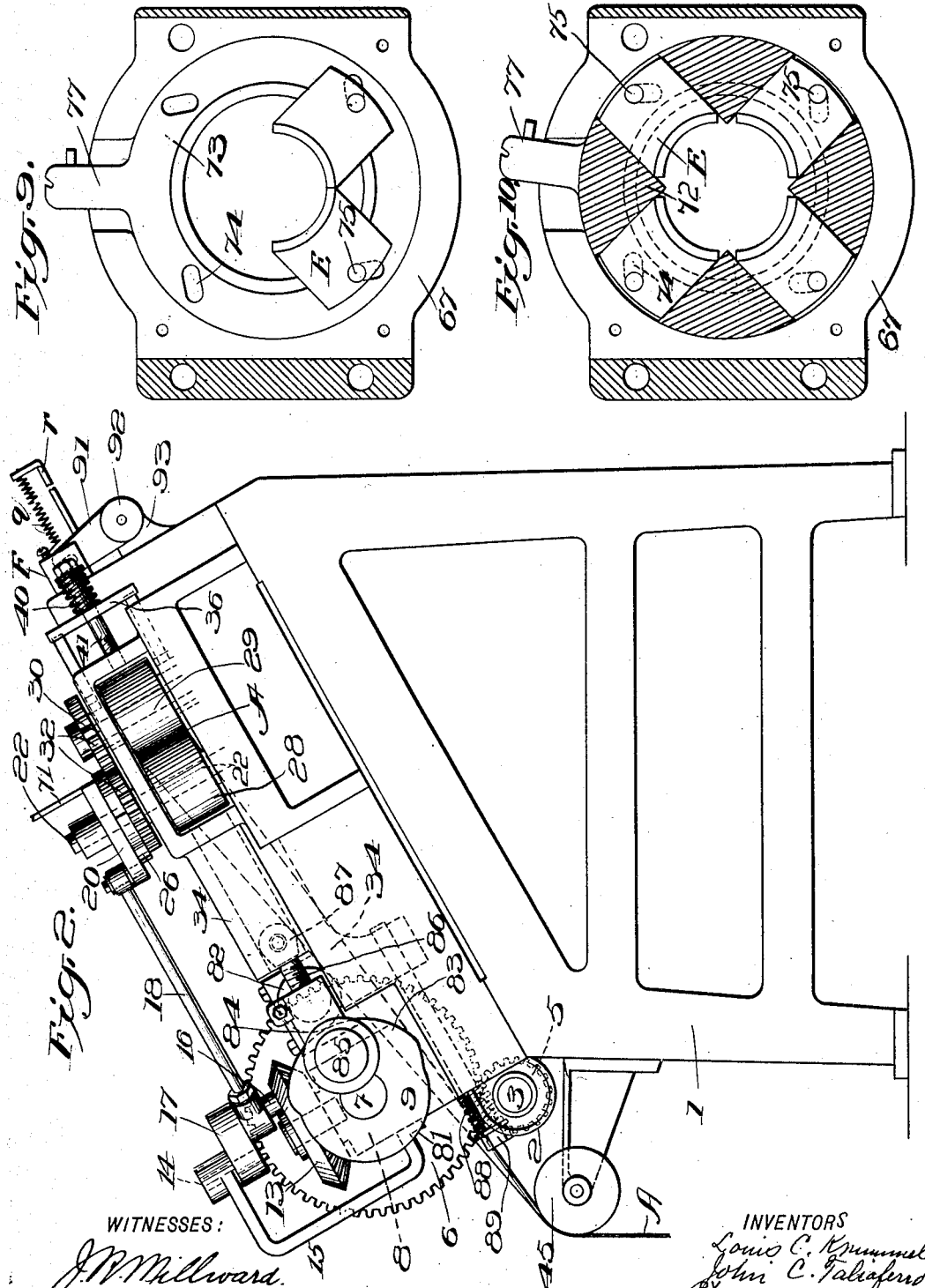
WITNESSES:
J. W. Millward.
Allan F. Foose.
INVENTORS
Louis C. Krummel
John C. Taliaferro
BY
Alfred Wilkinson
ATTORNEY No. 892,743. PATENTED JULY 7, 1908.
L. C. KRUMMEL & J. C. TALIAFERRO.
CAN CAP HEMMING MACHINE.
APPLICATION FILED JULY 20, 1906.
6 SHEETS—SHEET 3.
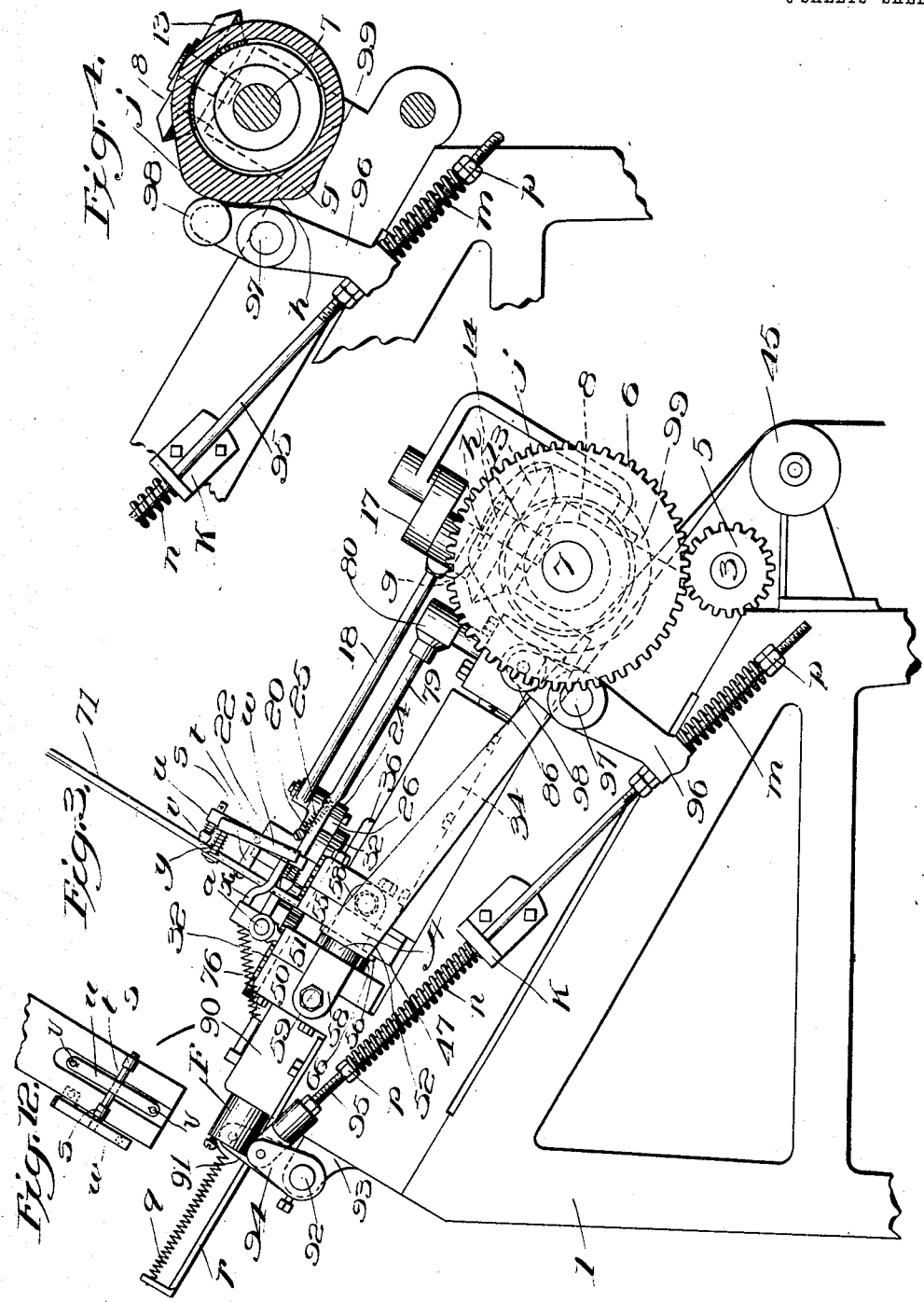
WITNESSES:
J. W. Millward.
Allan H. Foose.
INVENTORS
Louis C. Krummel
John C. Taliaferro
BY Alfred Wilkinson
ATTORNEY.

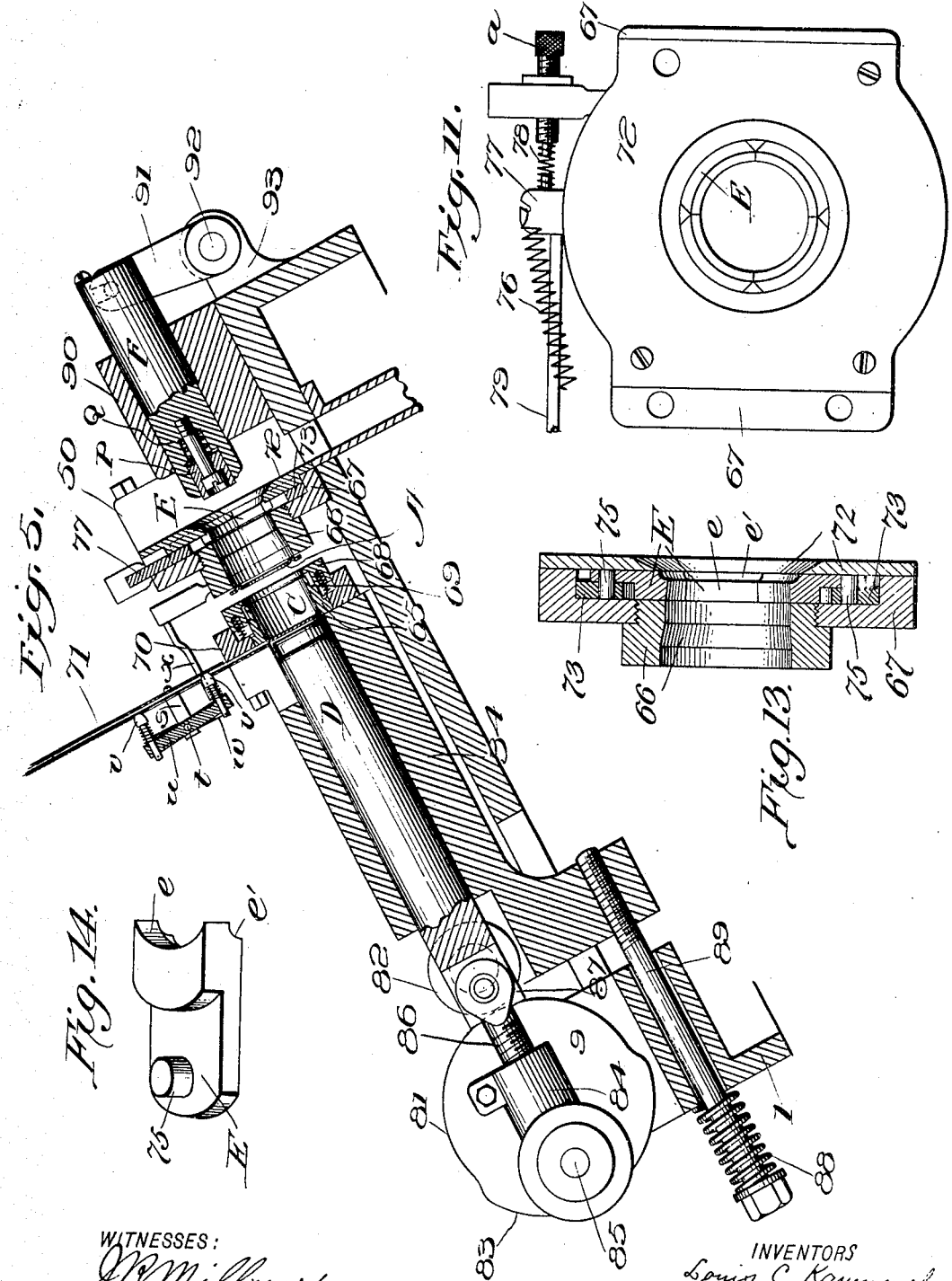

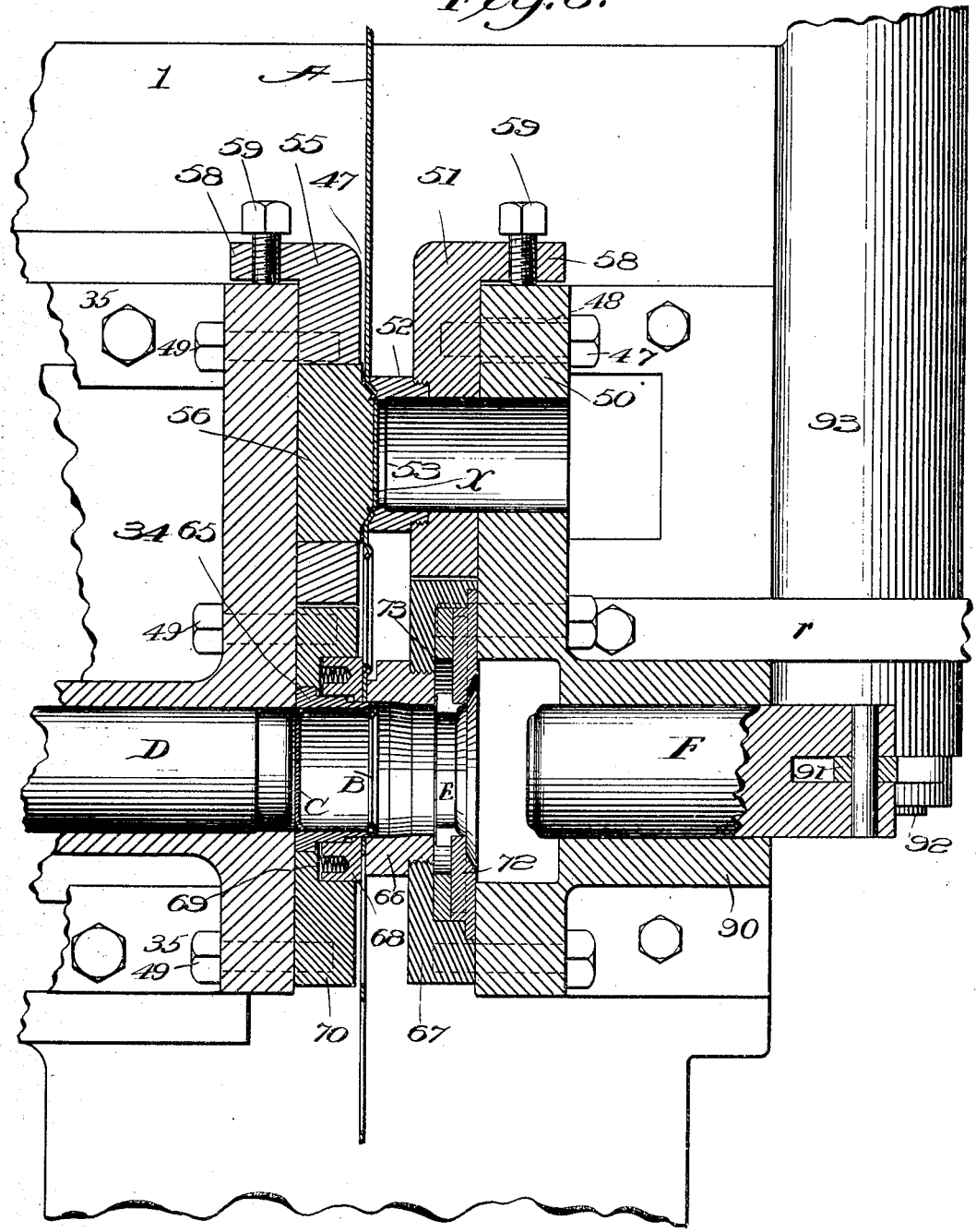

No. 892,743. PATENTED JULY 7, 1908.
L. C. KRUMMEL & J. C. TALIAFERRO.
CAN CAP HEMMING MACHINE.
APPLICATION FILED JULY 20, 1906.
6 SHEETS—SHEET 6.
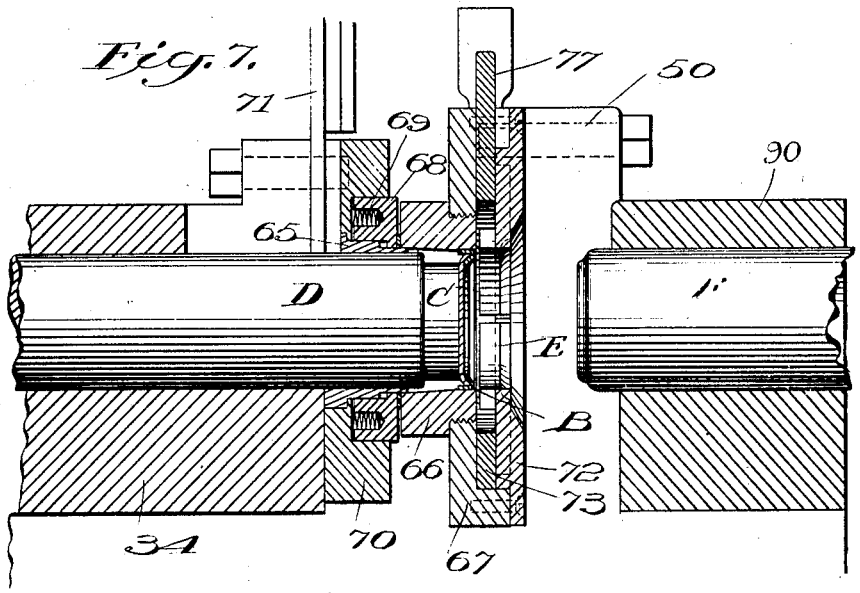
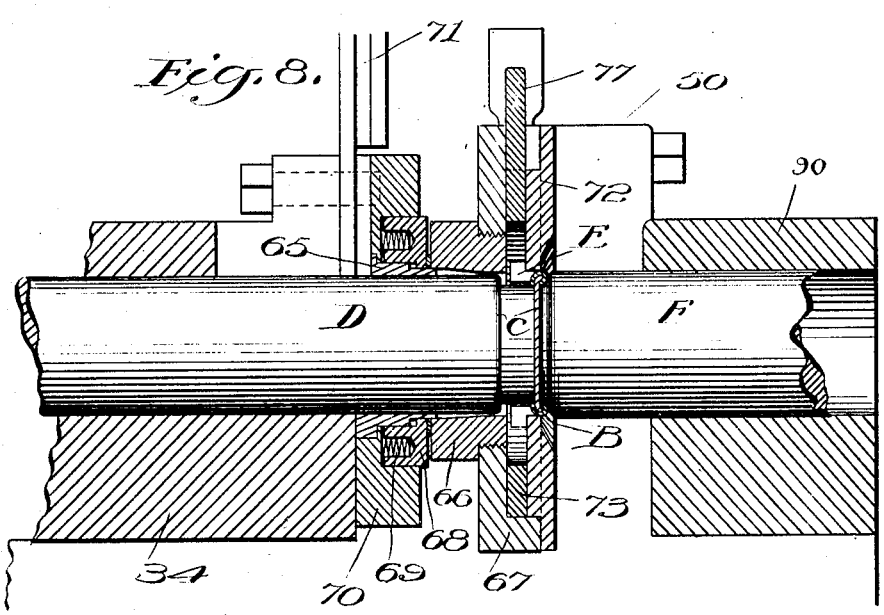
WITNESSES:
INVENTORS
ATTORNEY.

UNITED STATES PATENT OFFICE.

LOUIS C. KRUMMEL, OF CLINTON, CONNECTICUT, AND JOHN C. TALIAFERRO, OF BALTIMORE, MARYLAND, ASSIGNORS TO CONTINENTAL MACHINE COMPANY, OF SYRACUSE, NEW YORK, A CORPORATION OF NEW YORK.

CAN-CAP-HEMMING MACHINE.

No. 892,743.      Specification of Letters Patent.      Patented July 7, 1908.

Application filed July 20, 1906. Serial No. 327,064.

*To all whom it may concern:*

Be it known that we, LOUIS C. KRUMMEL, residing at Clinton, Middlesex county, State of Connecticut, a citizen of the United States, and JOHN C. TALIAFERRO, citizen of the United States, residing at Baltimore, in the State of Maryland, have invented new and useful Improvements in Can-Cap-Hemming Machines, of which the following is a specification.

Our invention relates to a cap-hemming machine for securing solder rings to the caps for tin cans, whereby the cap is finished as a complete article ready to be soldered in place.

The invention consists broadly in a machine operating on a new principle in which the solder rings, formed and cut from the solder ribbon, are brought into the path of the cans, and the various operations of forcing the cap into the ring and securing the ring on the cap are performed, while those parts are being moved through the machine in a straight path and without changing their direction of movement, whereby the solder ring is secured on the cap securely and smoothly, and the work is performed with certainty and great rapidity. Our invention lies also in the combinations of the various parts, and in the details of construction and arrangement of the parts.

The characteristic feature of our invention is a straight main passage, being preferably a tubular passage through the punch and the die and between the closing jaws, in which operates a plunger. The solder ribbon is fed across this passage by any suitable means. The solder ring having been formed and severed from the ribbon, rests momentarily in the passage, and the cap, fed into the passage behind the ring, is then immediately forced into the ring by the plunger, and the cap and ring together are then forced through the die and between the closing jaws or equivalent mechanism, whereby the various steps are performed of straightening up the ring flange, bending the flange inwardly over the cap and then crimping it fast and smooth. A plug may be arranged to operate in opposition to the plunger to hold the cap and ring and to effect this crimping. When the crimping has been completed, the parts of the machine open and the finished hemmed cap drops out.

In the construction of machine here shown, the cap is fed immediately in front of the plunger into the hollow-solder-ring cutting-punch, which forms part of the main passage. The cap there fits snugly so as to be perfectly centered and held true, without danger of tilting. The plunger at once advances to force the cap firmly into the ring groove and then to move the cap and ring together through the passage without releasing them until the hemming operation is completed.

The preferred form of machine embodying our invention is shown in the drawings herewith, in which the reference letters and numerals of the specification indicate the same parts in all the figures.

Figure 1 is a plan of the machine. Fig. 2 is a side elevation taken from the left of Fig. 1. Fig. 3 is a corresponding elevation taken from the right, with the ribbon guide removed. Fig. 4 is a portion of Fig. 3 showing the plug cam in section. Fig. 5 is an enlarged longitudinal section parallel to Fig. 2. Fig. 6 is an enlarged cross section parallel to Fig. 1. Figs. 7 and 8 are partial sections showing the operation of the machine and the parts in different position from Fig. 6. Figs. 9, 10 and 11 are elevations illustrating the closing jaws. Fig. 12 is a rear elevation of a portion of Fig. 3 relating to the cap feed-chute. Fig. 13 is a longitudinal section of a portion of Fig. 7 taken at a different angle to show a pair of opposite jaws in section. Fig. 14 is an isometric view of a single jaw detached.

In the figures, 1 indicates a suitable standard or frame having bearings 2 2 at the rear for the driving shaft 3, carrying the pulley 4 for a driving belt, and the pinion 5, meshing with the gear 6, on a parallel main shaft 7, journaled in a bearing 8, and carrying the main cam 9.

Connected by miter gears 13 13 to rotate with the main shaft is the crank 17 journaled by pin 14 in bracket 15, and connected by connecting rod 18 to the arm of the opening cam 20 for the closing-jaws; 16 is the crank-pin; this cam is suitably journaled, for instance, on one of the feed-roller shafts 22. Said opening, or oscillating cam 20, carries a pawl 24 held by a suitable spring 25 in engagement with the ratchet 26 on the feed roller 28, connected to the feed-roller 29 by gears 32 32, whereby the feed-rollers are rotated intermittingly to feed step-by-step the solder ribbon A, when the cross-head 34, operated by the main cam 9 in guide-ways 35, is retracted. One of the feed-roller shafts 22 may be journaled in a box 36 and the tension adjusted by means of the spring 40 on bolt 41. The ratchet 26 may have as many teeth as desirable; preferably the pawl moves one tooth for each movement of the solder-ribbon.

The ribbon A is drawn by the feed-rollers from a reel mounted at any suitable point over a roller 45 and through the guide 46 along the front edge of the cross-head, where, as a preliminary operation and in the first position, the central blank X is cut away to form the hole in the solder ring, and the ring suitably grooved; the ribbon is then fed one step, bringing the ring into the second position in the main passage, where all the other operations are effected of cutting the ring from the ribbon, delivering the cap into the ring, straightening the ring flange and pressing it in over the cap, and finally crimping the ring tight on the cap. A curved guide 46 is here shown, which is convenient in some cases, but the guide may be of any suitable form.

To the main bracket 50 is fitted a bolster 51 to which is secured the die 52, internally straight for a short distance, to prevent the punching dropping back and then very slightly offset at 53, to allow a slight clearance so that the punchings may easily be ejected (Fig. 6). To the cross-head 34 is fitted a corresponding back-bolster 55 carrying the punch 56, which is moved by the cross-head against the die to cut the center hole in the ring. This die and punch are also formed as shown to form the groove in the solder ring for the cap. Said die bolster 51 and back bolster 55 are provided with tongues 58 and adjusting screws 59 whereby the die and punch may be exactly centered to register. To this end, the securing bolt 47, for bolster 51, is arranged in slot 48 in main bracket 50. Similar slots in cross head 34 for bolts 49 may be provided, but are not necessary.

The center hole having been cut, the ribbon is moved forward to the second position, where, on the advance of the cross-head 34, the solder ring B is severed from the ribbon by the main or cutting-punch 65, secured on the cross-head by plunger plate 70, with which coöperates the main die 66 detachably secured as by a thread to its bolster or plate 67, so as to be removed when worn. Around the main-punch is arranged the cylindrical stripper 68 provided with springs 69 to force it forwardly, whereby the ribbon is held smooth between the flat surfaces of the stripper and the die, and is stripped off the main -punch when the cross-head is withdrawn.

The die and punch may be reversed, and the die arranged on the cross-head, but as they are both hollow, whichever part receives the cap from the chute receives it freely but snugly and centers the cap so that it is forced true into the ring. It will be seen that the ring is of larger diameter than the cap and is cut of proper size so that the cap fits exactly into the ring groove.

Immediately on the cutting of the ring, and while the cross-head dwells for an instant to permit the operation of the plunger D, said plunger, which has been withdrawn during the back stroke to permit the caps, or disks, C to be fed before it, one by one, through chute 71 by any suitable means, advances and forces the cap before it through the punch into the ring, generally so as to be embedded in the ring, and then with the ring through the hollow die 66 made slightly tapering internally, for the purpose of gradually straightening up the ring flange around the cap, into the position shown in Fig. 7, and toward the closing jaws E, operated by opening cam 20, now to be described. The operation is here effected first of turning the ring flange inwardly, so as to insure that it will be crimped in on the cap and not be upset outwardly, and second of crimping the ring tight on the cap. As the plunger moves the cap and ring forward, they are met just within the closing jaws by the plug F, controlled by mechanism to be described. The cap and ring so gripped are then carried forward through the jaws to the full stroke of the plunger. The jaws open to permit them to pass and preferably immediately close, whereby the flange is turned or started inwardly and the ring tightened and set true around the edge of the cap. The plunger then withdraws and the jaws remain closed, to act as a resistance or anvil against which the plug on its return acts finally to crimp down tight and smooth the solder ring on the cap. As a final step the plug withdraws and the jaws open to permit the finished cap to drop out. The jaws are beveled on their edges and on the outer surface to fit the cap of the form shown. As shown in Figs. 7 and 8, the ring flange is wider than the portion of the ring under the cap, thus bringing the bulk of the solder where desired. As best shown in Figs. 6, 9, 10, 11, 13 and 14, this closing jaw mechanism, consists of the four jaws E arranged in slide-ways in a bearing plate 72, fitted to a front recess in the die-plate 67 and moved radially at proper times by jaw-ring 73 having inclined, or cam, grooves 74 engaging with a pin 75 on each jaw. This ring is maintained in closed position by one or more closing springs 76, connected to ring arm 77, and is swung, or turned, to open the jaws to permit the cap, first to pass, and second to drop out, by jaw-lever 79, pivotally mounted at 80 and forced against the ring arm 77 in turn by the high points b and c on jaw-cam 20.

78 is a buffer-spring for the jaw lever 79, having an adjusting screw a. (See Fig. 1). The jaws, as best shown in Figs. 13 and 14 have rather thick edges of which the inner portion e, that is the portion first meeting the cap and ring, is beveled like the main die 66, and the outer portion e' is concave to coöperate with the plug finally to crimp the ring tight on the cap, as shown in Fig. 8.

The cross-head is operated by the main cam 9, engaging with anti-friction roller 82, and having the longer dwell 81 on the back stroke to permit the ribbon to move from the first position to the second, and a short dwell 83 on the in-stroke to permit the plunger to operate as aforesaid on the cap and ring. The plunger is operated during the said short dwell by the crank 84 journaled on the cam at 85 and connected to the plunger by screw connection 86 adjustably secured to the wrist 87 forming a part of said crank.

88 is a buffer spring for the cross-head fitted to bolt 89.

The plug F, fitted to a bearing 90, is operated by a crank 91 on the rock-shaft 92 arranged in bearings 93 on the front of the machine, and having crank 94 at its right, or outer, end connected by plug rod 95, arranged in bearing K, to the plug lever 96, journaled at 97 and having an anti-friction roller 98, engaging with the plug cam 99, which may be secured on the left face of the main gear, or connected to rotate therewith by other means. This cam has a cam face provided with a high point g, to advance the plug within the jaws, a lower point h to permit it to retract, and a second high point j preferably higher than g, whereby the ring is crimped hard against the closed jaws. m and n are respectively a buffer-spring and a tension-spring for the plug rod and p p are adjusting nuts for said springs. q is a tension spring connected to arm r and to the plug to take up any lost motion in the rocker arm and the plug lever and to act as a cushion against a sudden jar, when the punch crimps the ring on the cap. If desired the plug may be provided with a supplemental tip P; a similar tip might in some cases be desirable in the plunger; but the tip of the plunger is desirably made smaller to prevent jamming.

In Figs. 3 and 12 is shown desirable means for controlling the feed of the caps through the chute. In bearings s s on the sides of the chute is fitted a rock-pin t, carrying a vertically arranged rock-lever u, having both at its upper and at its lower end a stop-pin v, (provided with a buffer-spring). These pins are alternately rocked in and out of the chute passage to engage with the caps and permit them to pass one by one. On the end of the rock-pin is a trigger w which engages a stop x on the bolster 67, when the cross-head moves forward, and the rock-lever is rocked into the position shown in Fig. 3, permitting the lowest cap to drop from the chute into the main passage but retaining the upper caps in the chute. When the cross-head withdraws, the spring y reverses the position of the rock-lever and the stop pins, and the caps in the chute slide down one space, with the lowest resting on the lower stop-pin.

Having thus described our invention what we claim as new and desire to secure by Letters Patent, is:—

1. In a machine for hemming caps having a single straight passage, means for delivering the caps into said passage and means for forming the solder ring and delivering it into said passage in the path of the cap, and in combination therewith means to force the cap into the ring and then to force the cap and ring together through said passage, and means arranged in said passage to crimp the ring on to the cap.

2. In a machine for hemming caps provided with a straight tubular passage, the combination with means for feeding the solder ribbon across the passage, of means for delivering the caps one by one into the passage, and means arranged to operate in the straight passage for first cutting the ring from the ribbon, second forcing the cap into the ring groove, third moving the cap and the ring forward in the passage and turning the ring flange straight back, fourth bending slightly inwardly the ring flange over the upper surface of the cap and compressing the ring on the edge of the cap, and fifth crimping the ring firmly on the cap.

3. In a can cap hemming machine provided with a straight passage, means for delivering the caps and rings into the passage, and, in combination therewith, means operating in the passage for forcing the cap into the ring, means for turning back the ring flange, means for bending inwardly the ring flange and crimping the ring smoothly against the upper surface of the cap, all of said operations after the caps and rings have been delivered into the passage being effected while the cap and ring are moving forward in a straight line through the passage and without changing their direction of movement.

4. In a machine for hemming can caps having a straight tubular passage, the combination with means for delivering the caps into the passage, means for forming the solder ring and delivering it into the passage, means for forcing the cap forward in the passage into the ring groove, means for forcing the cap and ring in engagement forward in the passage, means for straightening the ring flange back while the parts are so moving forward, means operating in the passage for compressing the ring on the cap edge and bending the flange slightly in over the upper surface of the cap, and means operating in the passage for crimping the ring tight on the cap.

5. In a machine for hemming caps having a straight main passage, means to feed the caps in succession into the passage, means to move a solder ribbon step by step across the passage, means to cut the solder ring from the ribbon and to form the ring, a plunger to force the cap into the ring and to move the combined cap and ring through the passage, closing jaws in the passage, means to operate the jaws to permit the cap and ring to pass and then to close the jaws, a plug, and means to operate the plug to crimp the ring on the cap in coöperation with the jaws.

6. In a machine for hemming caps having a straight, tubular passage, substantially circular in cross section, of means to feed the caps in succession into the passage, means to move the solder ribbon step by step across the passage, means to cut the solder ring from the ribbon and to groove the ring, a plunger to force the cap into the ring and to move the combined cap and ring through the passage, means to operate the plunger, closing jaws in the passage, means to operate the jaws to permit the cap and ring to pass and then to close the jaws, a plug, and means to operate the plug against the jaws, to crimp the ring on the cap.

7. In a can-cap hemming machine having a straight tubular passage, the machine being so arranged that said passage is upwardly and forwardly inclined, the combination with means for forming the solder rings and delivering them one by one into the passage, of means for delivering the caps, one by one, into the passage behind the rings, a plunger arranged to move the cap and the ring forward through the passage, means to operate the plunger, a plug arranged in alinement with the plunger and means to move the plug first to grip the cap and ring between it and the plunger, then to retract the plug and then to move it again rearwardly to compress the cap and ring against a suitable abutment, to crimp the ring on the cap.

8. In a machine for hemming caps provided with a main tubular passage, the combination with means for forming the solder ring and cutting the center therefrom, of means for delivering the ring into the passage and severing the ring from the ribbon, means for delivering the cap into the passage behind the ring, closing jaws in the passage near the forward end, means to open and close the jaws, means to force the cap and the ring through the passage and between the jaws, and means to force the cap and the ring back against the jaws to crimp the ring on the cap.

9. In a can-cap hemming machine having a straight, tubular passage, the combination with means for forming the solder ring and delivering it into the passage, of means for delivering the cap into the passage behind the ring, radially sliding jaws arranged to extend into the passage near its outer end, means to open and close the jaws, a plunger arranged to move the cap and ring forward through the passage and between the jaws, means to operate the plunger, a plug arranged in alinement with the plunger and adapted to move reversely thereto, and means to move the plunger rearwardly between the jaws and to grip the combined cap and ring in conjunction with the plunger and means then to retract the plug and again to move it rearwardly finally to crimp the ring on the cap by the pressure of the plunger against the closed jaws.

10. In a machine for hemming can caps, provided with a straight passage, the combination with means to deliver the caps and the rings into the passage toward one end, of closing jaws arranged near the other end of the passage, means to force the cap into the ring and move the two together through the passage and between the jaws, means to open the jaws to permit the cap and ring to pass and then to close the jaws to bend slightly in the ring flange and to compress the ring on the edge of the cap, and means to force the cap and ring back against the closed jaws to crimp the ring on the cap.

11. In a machine for hemming can caps, the combination with a supporting frame, of a tubular die fixed thereon, a cross-head, a tubular punch on the cross-head to fit within the die, means to move the solder ribbon between the die and the punch, means to advance the cross-head to cut the ring from the ribbon by the coöperation of the punch and the die, a plunger fitted to a bearing on the cross-head in alinement with the passage through the die and the punch, means to deliver the caps into the passage in front of the plunger, means to advance the plunger independently of the cross-head, when the cross-head is in forward position, to move the cap and ring through the tubular die and punch, a tubular stripper arranged around the punch, and springs to force the stripper beyond the punch when the cross-head is retracted.

12. In a machine for hemming can caps, the combination with a supporting frame, of a tubular die fixed thereon, said die being of suitable interior diameter to receive the solder ring and tapering from a large diameter at its mouth to a slightly smaller diameter, of a cross-head, a tubular punch on the cross-head, said punch fitting within the die and being of a suitable interior diameter to receive the cap, means to move the solder ribbon between the die and the punch, means to advance the cross-head to cut the ring from the ribbon by the coöperation of the punch and the die, a plunger fitted to a bearing on the cross-head in alinement with the passage through the die and the punch, said plunger having a top of smaller diameter than its shaft, means to deliver the caps into the passage in front of the plunger, means to advance the plunger independently of the cross-head, when the cross-head is in forward position to move the cap and ring through the tubular die and punch, a tubular stripper arranged around the punch, and springs to force the stripper beyond the punch when the cross-head is retracted.

13. In a can-cap hemming machine, the combination with a suitable supporting frame, of a die fixed thereon, a cross-head fitted to slide on the frame, a punch on the cross-head fitting within the die, said die and punch being hollow to form a passage for the cap and ring and the hollow interior of the die being slightly tapered, means to move the solder ribbon between the punch and the die, means to advance the cross-head to cut the ring from the ribbon by the conjunction or coöperation of the punch and the die, an annular stripper arranged to fit around the punch, springs to force the stripper forward beyond the punch when the cross-head is drawn back, a circle of radially moving or sliding jaws arranged beyond the tapered portion of the die to extend into the passage, a plunger operating in the passage, means to operate the plunger to force the cap and the ring through the passage and beyond the jaws, a plug arranged in the outer end of the passage, and means to operate the plug to complete the crimping of the ring on the cap in coöperation with the closed jaws.

14. In a can-cap hemming machine, the combination with a suitable frame, of a main bracket thereon, a bolster on the bracket, a tubular ring center cutting die, detachably secured on the bolster, said die being slightly enlarged or offset a short distance from its mouth, a cross-head fitted to inclined guideways on the frame, a bolster on the cross-head, a punch on said cross-head bolster to coöperate with said die to cut the center blank from the solder ring, securing screws to secure said bolsters in position, a die plate secured on the bracket parallel to and at one side of the fixed bolster, a main tubular die detachably secured on said die plate, said main die interiorly tapering and being of an interior diameter snugly to receive the solder ring, a punch plate secured on the cross-head opposite to the die plate, a tubular punch detachably secured on said punch plate, said tubular punch being adapted to fit within the main die and being of an interior diameter snugly to receive the cap, a plunger having a tip of reduced size arranged to move the cap and the solder ring through the passage formed by said tubular die and punch, radially moving jaws supported in front of said main die, means to open and to close the jaws, a plug arranged in a bearing forwardly of the jaws and in alinement with the plunger, means to operate the cross-head, means to operate the plunger independently of the main shaft when the cross-head is in forward position, means to engage with the solder ribbon and feed it step by step between the dies and the punches and means to operate the plug reversely to the plunger and in coöperation with the plunger and the jaws, substantially as described and shown.

15. In a can-cap hemming machine, the combination with a suitable frame, of a main bracket thereon, a die plate secured on the frame, a main tubular die detachably secured on said die plate, said main die interiorly tapering and being of an interior diameter snugly to receive the solder ring, a punch plate secured on the cross-head opposite to the die plate, a tubular punch detachably secured on said punch plate, said tubular punch being adapted to fit within the main die and being of an interior diameter snugly to receive the cap, a plunger having a tip of reduced size arranged to move the cap and the solder ring through the passage formed by said tubular die and punch, a series of radially moving jaws suitably supported in front of said main die; a plug arranged in a bearing forwardly of the jaws and in alinement with the plunger, a suitable shaft, means to operate said shaft, a main cam on said shaft rotating in engagement with the cross-head and adapted to move the cross-head in an upward and forward incline, said cam being formed with a long dwell to operate when the cross-head is forward and with a short dwell to operate when the cross head is back, a crank on said cam connected to the plunger, means to cut the center blank for the ring in the ribbon, means to groove the ribbon around the hole so formed, means to feed the solder ribbon step by step between the die and the punch, and means to operate the plug reversely to the plunger, to coöperate with the plunger and with the jaws, substantially as described and shown.

16. In a machine for hemming caps provided with a straight tubular passage, the combination with means for feeding the solder ribbon across the passage, of means for delivering the caps one by one into the passage, and a series of means operating in said passage in succession for cutting the solder ring from the ribbon, forcing the cap into the ring, moving the cap and ring forward in the passage, and finally crimping the ring tight and smooth onto the cap.

17. In a cap hemming machine provided with a straight passage, means for delivering the caps and rings into the passage, and in combination therewith means for forcing the cap into the ring and means for crimping the ring tight and smooth against the upper surface of the cap, said operations, after the caps and rings have been delivered into the passage, being effected while the caps and rings are moving forward in a straight line through the passage and without changing their direction of movement.

18. In a machine for hemming can caps having a straight tubular passage, the combination with means for cutting the center blank from the ring in the ribbon and suitably grooving the ring, means for moving the ribbon to bring the ring so formed into the passage, means operating in the passage for separating the ring from the ribbon, means for delivering the caps into the passages and moving them forward therein in the ring groove, and means operating in the passage to crimp the ring tight and smooth onto the cap.

In testimony whereof we have signed our names to this specification in the presence of two subscribing witnesses.

LOUIS C. KRUMMEL.
JOHN C. TALIAFERRO.

Witnesses:
J. R. MILLWARD,
M. B. SMITH.